United States Patent
Brakensiek et al.

(10) Patent No.: US 8,930,439 B2
(45) Date of Patent: Jan. 6, 2015

(54) METHOD AND APPARATUS FOR PROVIDING COOPERATIVE USER INTERFACE LAYER MANAGEMENT WITH RESPECT TO INTER-DEVICE COMMUNICATIONS

(75) Inventors: Jorg Brakensiek, Mountain View, CA (US); Raja Bose, Mountain View, CA (US)

(73) Assignee: Nokia Corporation, Espoo (FI)

( * ) Notice: Subject to any disclaimer, the term of this patent is extended or adjusted under 35 U.S.C. 154(b) by 1083 days.

(21) Appl. No.: 12/770,880

(22) Filed: Apr. 30, 2010

(65) Prior Publication Data

US 2011/0271198 A1 Nov. 3, 2011

(51) Int. Cl.
| | | |
|---|---|---|
| G06F 15/16 | (2006.01) | |
| G06F 3/14 | (2006.01) | |
| G06F 9/44 | (2006.01) | |
| H04L 29/08 | (2006.01) | |
| H04L 29/06 | (2006.01) | |

(52) U.S. Cl.
CPC .............. *G06F 3/1454* (2013.01); *G06F 9/44* (2013.01); *H04L 67/08* (2013.01); *H04L 67/36* (2013.01); *H04L 67/14* (2013.01); *H04L 69/18* (2013.01); *G09G 2370/022* (2013.01); *G09G 2380/10* (2013.01)
USPC ........... 709/203; 709/204; 718/102; 718/100; 712/28

(58) Field of Classification Search
USPC ................................ 709/203, 204
See application file for complete search history.

(56) References Cited

U.S. PATENT DOCUMENTS

| | | | |
|---|---|---|---|
| 6,892,359 B1 | 5/2005 | Nason et al. | |
| 8,230,426 B2 * | 7/2012 | Powers et al. ................. | 718/102 |
| 2004/0181796 A1 | 9/2004 | Fedotov et al. | |
| 2006/0282253 A1 | 12/2006 | Buswell et al. | |
| 2009/0210488 A1 * | 8/2009 | Lee ............................... | 709/203 |
| 2009/0265648 A1 | 10/2009 | Ryu et al. | |
| 2010/0011299 A1 | 1/2010 | Brodersen et al. | |
| 2010/0042678 A1 | 2/2010 | Park et al. | |
| 2010/0262929 A1 | 10/2010 | Avery | |

OTHER PUBLICATIONS

International Search Report and Written Opinion for International Application No. PCT/FI2011/050328 dated Aug. 4, 2011.
Supplementary European Search Report for Application No. EP 11 77 4470 dated Nov. 4, 2013.
Benetton launch FIA press release, Federation Internationale de L'Automobile (FIA), Motorsport.com, XP009173762, May 8, 1994, 3 pages.

* cited by examiner

*Primary Examiner* — Kyung H Shin
(74) *Attorney, Agent, or Firm* — Alston & Bird LLP (57) ABSTRACT

An apparatus for providing cooperative user interface layer management may include at least one processor and at least one memory including computer program code. The at least one memory and the computer program code may be configured, with the processor, to cause the apparatus to perform at least maintaining a terminal session between a server device and a client device in which the client device emulates at least a portion of a display presented at the server device, receiving, at the server device, an indication identifying a user interface layer for which display of information related to the user interface layer is not supported at the client device, and determining a response to a user input provided at the client device based on whether the user input relates to the user interface layer identified by the indication. A corresponding method and computer program product are also provided.

17 Claims, 4 Drawing Sheets

METHOD AND APPARATUS FOR PROVIDING COOPERATIVE USER INTERFACE LAYER MANAGEMENT WITH RESPECT TO INTER-DEVICE COMMUNICATIONS

TECHNOLOGICAL FIELD

Embodiments of the present invention relate generally to inter-device communications technology and, more particularly, relate to an apparatus and method for providing cooperative user interface layer management with respect to inter-device communications.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. In order to provide easier or faster information transfer and convenience, telecommunication industry service providers are developing improvements to existing networks. In this regard, wireless communication has become increasingly popular in recent years due, at least in part, to reductions in size and cost along with improvements in battery life and computing capacity of mobile electronic devices. As such, mobile electronic devices have become more capable, easier to use, and cheaper to obtain. Due to the now ubiquitous nature of mobile electronic devices, people of all ages and education levels are utilizing mobile terminals to communicate with other individuals or contacts, receive services and/or share information, media and other content. Moreover, for many individuals, mobile electronic devices such as portable digital assistants (PDAs), pagers, mobile televisions, mobile telephones, gaming devices, laptop computers, cameras, video recorders, audio/video players, radios, global positioning system (GPS) devices, become heavily relied upon for work, play, entertainment, socialization and other functions. Thus, many people are very connected to their respective mobile electronic devices.

Given the personal connection many people have to their mobile electronic devices, and their ability and penchant for having such devices with them, it is not uncommon for many people to prefer to use their personal mobile electronic device as a source for information and/or services, even in situations where another (perhaps more or less flexible) device is already in place to provide a particular type of information and/or service.

Accordingly, it may be desirable to provide an improved mechanism by which a mobile electronic device or mobile terminal may interface with other devices.

BRIEF SUMMARY OF EXAMPLE EMBODIMENTS

A method and apparatus are therefore provided that may enable the provision of cooperative user interface layer management a mobile terminal of the user and some other remote device or remote environment (e.g., a car head unit). In this regard, for example, the mobile terminal of a user and the remote environment may exchange information to identify specific user input layers that are not to be displayed at the remote environment so that the mobile terminal can manage the inputs received at the remote environment relative to the user interface options that are permitted in the remote environment. Thus, for example, white list information defining useable or supportable user interface layers and black list information defining user interface layers that are to be disabled may be provided to the mobile terminal to enable the mobile terminal to manage provision of cooperative user interface layer management.

In one example embodiment, a method of providing cooperative user interface layer management is provided. The method may include maintaining a terminal session between a server device and a client device in which the client device emulates at least a portion of a display presented at the server device, receiving, at the server device, an indication identifying a user interface layer for which display of information related to the user interface layer is not supported at the client device, and determining a response to a user input provided at the client device based on whether the user input relates to the user interface layer identified by the indication.

In another example embodiment, a computer program product for providing cooperative user interface layer management is provided. The computer program product may include at least one computer-readable storage medium having computer-executable program code instructions stored therein. The computer-executable program code instructions may include program code instructions for maintaining a terminal session between a server device and a client device in which the client device emulates at least a portion of a display presented at the server device, receiving, at the server device, an indication identifying a user interface layer for which display of information related to the user interface layer is not supported at the client device, and determining a response to a user input provided at the client device based on whether the user input relates to the user interface layer identified by the indication.

In another example embodiment, an apparatus for providing cooperative user interface layer management is provided. The apparatus may include at least one processor and at least one memory including computer program code. The at least one memory and the computer program code may be configured, with the processor, to cause the apparatus to perform at least maintaining a terminal session between a server device and a client device in which the client device emulates at least a portion of a display presented at the server device, receiving, at the server device, an indication identifying a user interface layer for which display of information related to the user interface layer is not supported at the client device, and determining a response to a user input provided at the client device based on whether the user input relates to the user interface layer identified by the indication.

In another example embodiment, an apparatus for providing cooperative user interface layer management is provided. The apparatus may include means for maintaining a terminal session between a server device and a client device in which the client device emulates at least a portion of a display presented at the server device, means for receiving, at the server device, an indication identifying a user interface layer for which display of information related to the user interface layer is not supported at the client device, and means for determining a response to a user input provided at the client device based on whether the user input relates to the user interface layer identified by the indication.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical storage medium (e.g., volatile or non-volatile memory device), can be differentiated from a "computer-readable transmission medium," which refers to an electromagnetic signal.

As indicated above, mobile terminals are becoming very common and very personal to their respective users. As such, the user interface options offered by a mobile terminal may often be very familiar to their respective users. Moreover, user interface options offered by the mobile terminal may in some cases be more robust and more flexible than the interfaces offered by certain remote environments (although the opposite may apply in some cases). Accordingly, given the opportunity to interact with a remote environment that can communicate with the mobile terminal to enable control functions for the remote environment to be provided via the mobile terminal's user interface, many users may prefer to engage the user interface of the mobile terminal. As an example, in some embodiments, services that may be accessible via the mobile terminal (e.g., associated with specific applications that are executed on the mobile terminal such as a media player, a navigation application, search functions and/or the like) and the corresponding user interfaces associated therewith may be emulated at the remote environment by establishment and maintenance of a terminal session between the mobile terminal and the remote environment where the mobile terminal is a server device providing user interface display content to be emulated at the remote environment acting as a client device. However, there may be certain context rules that would impact operability of certain user interface layers that would otherwise be emulated to the remote environment for safety, regulatory or other reasons. As such, it may be desirable to enable such context rules, or the potential limitations on user interface layers that they impose, to be provided to the mobile terminal so that the mobile terminal may manage the interaction between input events received and the user interface layers that are viable (or not viable) options based on the context rules.

For example, a head unit or other display of a car (acting as an example of a remote environment) may be placed in communication with a mobile terminal (e.g., wirelessly or by placing the mobile terminal in a communication cradle) such that the mobile terminal user interface for a particular application (e.g., a media player) may be displayed or emulated on the head unit during the terminal session that is maintained between the mobile terminal and the head unit. However, the car may (e.g., by virtue of safety requirements) have limited access to certain user interface layers (e.g., SMS or email message alerts or other notifications) when the car is in motion at all or above a certain speed. Thus, it may be desirable to inform the mobile terminal of the user interface layers that are not to be presented at the remote terminal under certain circumstances in order to ensure that the safety requirements cannot be undermined. In some embodiments, a user interface layer may include all user interface elements associated with a particular application. As such, each user interface layer may correspond to a separate application. However, in other contexts, a user interface layer may include a set of related user interface elements comprising a particular feature of an application. For example, for a media player application, video data may be provided as one user interface layer, while audio data may be provided as a separate user interface layer and text could be provided in still another layer. Other features may also represent user interface layers themselves, such as tool bars, notifications or other elements or sets of elements that may be displayed in a particular context.

Some embodiments of the present invention may provide a mechanism by which improvements may be experienced in relation to the interoperability of mobile terminals with remote environments. In this regard, for example, a mobile terminal may be placed in communication with a remote device or environment, and the mobile terminal and the remote environment may exchange information on user interface layers that are to be enabled and/or disabled based on the current context of the remote environment. Thus, for example, in situations where the user interface of the mobile terminal is being used to interface with the remote environment, the context rules that define enabled or disabled user interface layers at the remote environment may be applied in order to inform the mobile terminal of enabled (white listed) or disabled (black listed) user interface layers. The mobile terminal can then adjust its layer hierarchy based on the black listed and/or white listed user interface layers and/or redirect inputs received that may correspond to black listed layers such that they are applied to an appropriate layer or the top most white listed layer.

Figure 1:
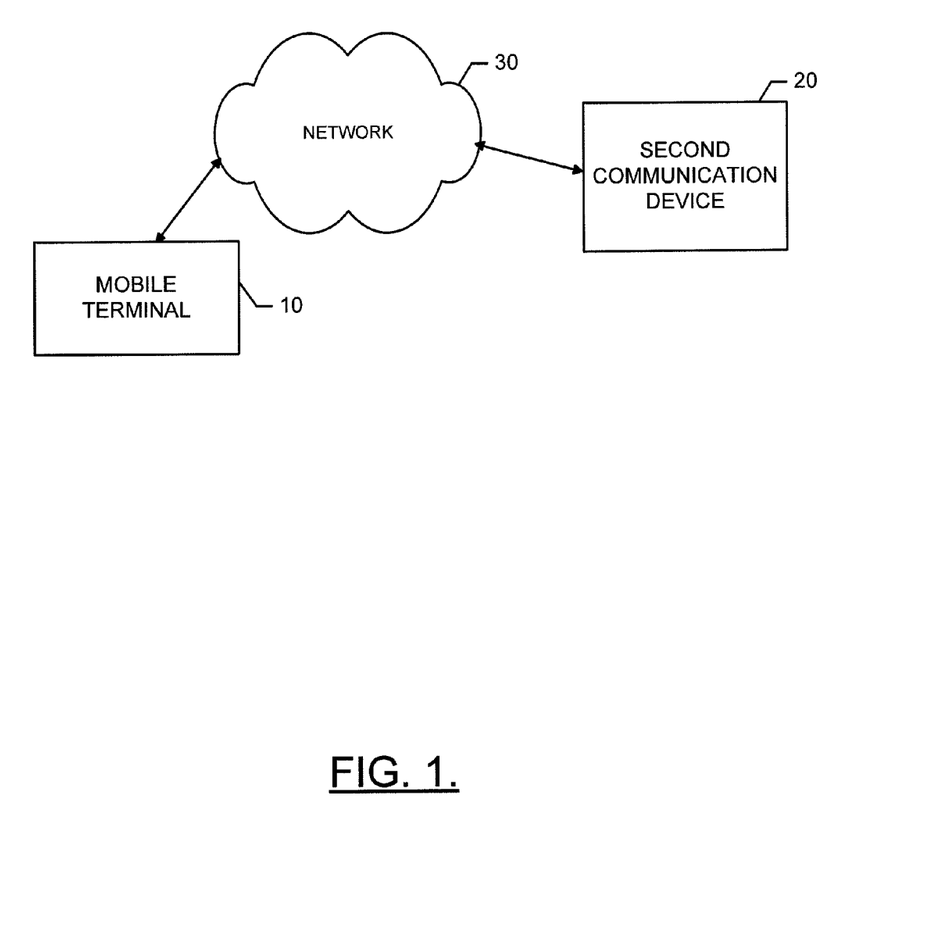
FIG. 1 illustrates one example of a communication system according to an example embodiment of the present invention.

FIG. 1 illustrates a generic system diagram in which a device such as a mobile terminal 10, which may benefit from embodiments of the present invention, is shown in an example communication environment. As shown in FIG. 1, an embodiment of a system in accordance with an example embodiment of the present invention may include a first communication device (e.g., mobile terminal 10) and a second communication device 20 capable of communication with each other. In an example embodiment, the mobile terminal 10 and the second communication device 20 may be in communication with each other via a network 30. In some cases, embodiments of the present invention may further include one or more network devices with which the mobile terminal 10 and/or the second communication device 20 may communicate to provide, request and/or receive information.

It should be noted that although FIG. 1 shows a communication environment that may support client/server application execution, in some embodiments, the mobile terminal 10 and/or the second communication device 20 may employ embodiments of the present invention without any network communication, but instead via a direct communication link between the mobile terminal 10 and the second communication device 20 (e.g., when the mobile terminal 10 is placed in a cradle or otherwise placed in wired communication with the second communication device 20). As such, for example, applications executed locally at the mobile terminal 10 and served to the second communication device 20 via a direct wired or wireless link may also benefit from embodiments of the present invention. However, it should be noted that communication techniques such as those described herein can be used not only in embedded devices, but in desktops and servers as well.

The network 30, if employed, may include a collection of various different nodes, devices or functions that may be in communication with each other via corresponding wired and/or wireless interfaces. As such, the illustration of FIG. 1 should be understood to be an example of a broad view of certain elements of the system and not an all inclusive or detailed view of the system or the network 30. One or more communication terminals such as the mobile terminal 10 and the second communication device 20 may be in communication with each other via the network 30 or via device to device (D2D) communication and each may include an antenna or antennas for transmitting signals to and for receiving signals from a base site, which could be, for example a base station that is a part of one or more cellular or mobile networks or an access point that may be coupled to a data network, such as a local area network (LAN), a metropolitan area network (MAN), and/or a wide area network (WAN), such as the Internet. In turn, other devices such as processing elements (e.g., personal computers, server computers or the like) may be coupled to the mobile terminal 10 and/or the second communication device 20 via the network 30. By directly or indirectly connecting the mobile terminal 10 and/or the second communication device 20 and other devices to the network 30 or to each other, the mobile terminal 10 and/or the second communication device 20 may be enabled to communicate with the other devices or each other, for example, according to numerous communication protocols including Hypertext Transfer Protocol (HTTP) and/or the like, to thereby carry out various communication or other functions of the mobile terminal 10 and the second communication device 20, respectively.

Furthermore, although not specifically shown in FIG. 1, the mobile terminal 10 and the second communication device 20 may communicate in accordance with, for example, radio frequency (RF), Bluetooth (BT), Infrared (IR) or any of a number of different wireline or wireless communication techniques, including LAN, wireless LAN (WLAN), Worldwide Interoperability for Microwave Access (WiMAX), WiFi, ultra-wide band (UWB), Wibree techniques and/or the like. As such, the mobile terminal 10 and the second communication device 20 may be enabled to communicate with the network 30 and each other by any of numerous different access mechanisms. For example, mobile access mechanisms such as wideband code division multiple access (W-CDMA), CDMA2000, global system for mobile communications (GSM), general packet radio service (GPRS) and/or the like may be supported as well as wireless access mechanisms such as WLAN, WiMAX, and/or the like and fixed access mechanisms such as digital subscriber line (DSL), cable modems, Ethernet and/or the like.

In example embodiments, the first communication device (e.g., the mobile terminal 10) may be a mobile communication device such as, for example, a PDA, wireless telephone, mobile computing device, camera, video recorder, audio/video player, positioning device (e.g., a GPS device), game device, television device, radio device, or various other like devices or combinations thereof. The second communication device 20 may also be a mobile device such as those listed above or other mobile or embedded devices, but could also be a fixed communication device in some instances. For example, the second communication device 20 could be an in-car navigation system, a vehicle entertainment system, a vehicle head unit or any of a number of other remote environments with which the mobile terminal 10 may communicate.

In an example embodiment, the network 30 may provide for virtual network computing (VNC) operation between the mobile terminal 10 and the second communication device 20. As such, for example, the mobile terminal 10 may serve as a VNC server configured to provide content originally executed or accessed by the mobile terminal 10 to the second communication device 20 acting as a VNC client (or vice versa). A VNC protocol such as RFB (remote frame buffer) or another protocol for enabling remote access to a graphical user interface may be utilized to provide communication between the mobile terminal 10 and the second communication device 20. Moreover, according to one example, the second communication device 20 may be a vehicle entertainment system (e.g., one or more speakers and one or more displays mounted in a head rest, from the ceiling, from the dashboard, or from any other portion of a vehicle such as an automobile).

Figure 2:
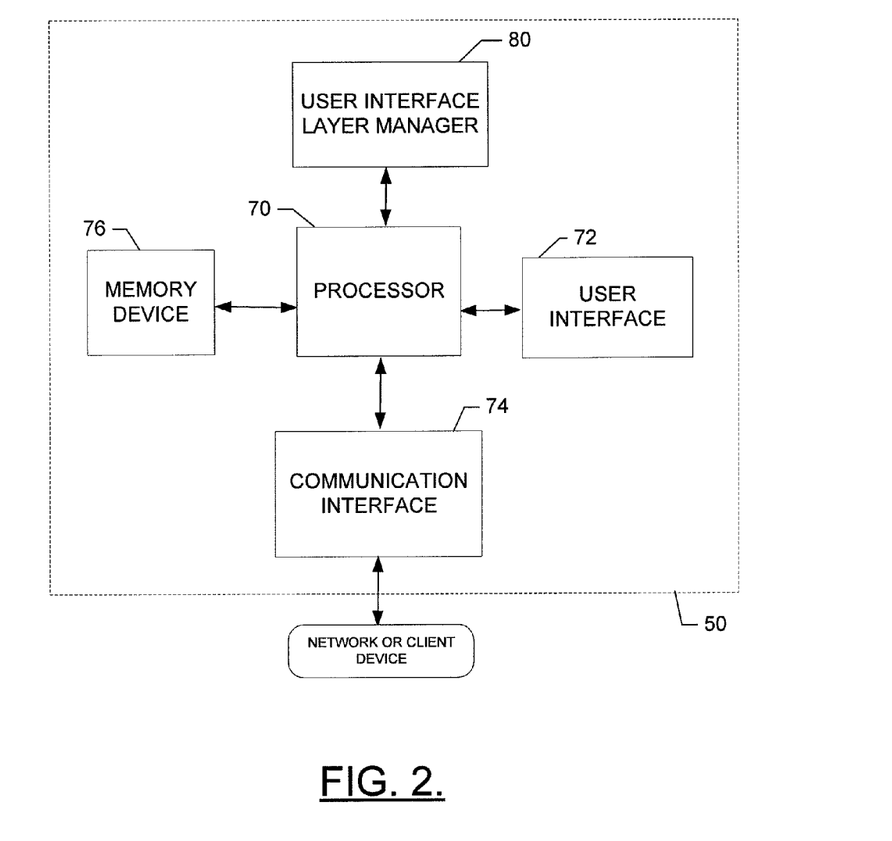
FIG. 2 illustrates a schematic block diagram of an apparatus for providing cooperative user interface layer management according to an example embodiment of the present invention.

In an example embodiment, the mobile terminal 10 may be configured to include or otherwise employ an apparatus according to an example embodiment of the present invention. FIG. 2 illustrates a schematic block diagram of an apparatus for providing cooperative user interface layer management according to an example embodiment of the present invention. An example embodiment of the invention will now be described with reference to FIG. 2, in which certain elements of an apparatus 50 for providing cooperative user interface layer management are displayed. The apparatus 50 of FIG. 2 may be employed, for example, on a communication device (e.g., the mobile terminal 10 and/or the second communication device 20) or a variety of other devices, such as, for example, any of the devices listed above when such devices are acting as a server device. However, it should be noted that the components, devices or elements described below may not be mandatory and thus some may be omitted in certain embodiments. Additionally, some embodiments may include further components, devices or elements beyond those shown and described herein. Furthermore, it should be noted that the terms "server device" and "client device" are simply used to describe respective roles that devices may play in connection with communication with each other. As such, a server device is not necessarily a dedicated server, but may be any device such as a mobile terminal that acts as a server relative to another device (e.g., a remote environment) receiving services from the server device. As such, the other device (e.g., the remote environment) may therefore be acting as a client device.

Referring now to FIG. 2, the apparatus 50 may include or otherwise be in communication with a processor 70, a user interface 72, a communication interface 74 and a memory device 76. The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device). The memory device 76 may be configured to store information, data, applications, instructions or the like for enabling the apparatus to carry out various functions in accordance with example embodiments of the present invention. For example, the memory device 76 could be configured to buffer input data for processing by the processor 70. Additionally or alternatively, the memory device 76 could be configured to store instructions for execution by the processor 70.

The processor 70 may be embodied in a number of different ways. For example, the processor 70 may be embodied as one or more of various processing means such as a coprocessor, a microprocessor, a controller, a digital signal processor (DSP), a processing element with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, processing circuitry, or the like. In an exemplary embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to embodiments of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., the mobile terminal 10 or the second communication device 20) adapted for employing embodiments of the present invention by further configuration of the processor 70 by instructions for performing the algorithms and/or operations described herein. By executing the instructions or programming provided thereto or associated with the configuration of the processor 70, the processor 70 may cause corresponding functionality to be performed. The processor 70 may include, among other things, a clock, an arithmetic logic unit (ALU) and logic gates configured to support operation of the processor 70.

Meanwhile, the communication interface 74 may be any means such as a device or circuitry embodied in either hardware, software, or a combination of hardware and software that is configured to receive and/or transmit data from/to a network and/or any other device or module in communication with the apparatus. In this regard, the communication interface 74 may include, for example, an antenna (or multiple antennas) and supporting hardware and/or software for enabling communications with a wireless communication network. In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a display, a touch screen, soft keys, a microphone, a speaker, or other input/output mechanisms. In an exemplary embodiment in which the apparatus is embodied as a server or some other network devices, the user interface 72 may be limited, or eliminated. However, in an embodiment in which the apparatus is embodied as a communication device (e.g., the mobile terminal 10 or the second communication device 20), the user interface 72 may include, among other devices or elements, any or all of a speaker, a microphone, a display, and a keyboard or the like. In this regard, for example, the processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

In an exemplary embodiment, the processor 70 may be embodied as, include or otherwise control a user interface layer manager 80. As such, in some embodiments, the processor 70 may be said to cause, direct or control the execution or occurrence of the various functions attributed to the user interface layer manager 80 as described herein. The user interface layer manager 80 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the user interface layer manager 80 as described herein. Thus, in examples in which software is employed, a device or circuitry (e.g., the processor 70 in one example) executing the software forms the structure associated with such means.

In an example embodiment, the user interface layer manager 80 may be configured to interface with a client device (e.g., via the communication interface 74) to establish and maintain a terminal session between a server device hosting the user interface layer manager 80 and the client device in which the client device emulates at least a portion of a display presented at the server device. As such, the user interface layer manager 80 may, for example, facilitate a remote frame buffer copying process to copy frames from the content rendered at the server device (e.g., the mobile terminal 10) in a first frame buffer over to a second frame buffer at the client device (e.g., second communication device 20) for rendering at the client device. The rendering at the client device may therefore appear as an emulation of selected portions of the content rendered at the server device.

In an example embodiment, the user interface layer manager 80 may be further configured to receive an indication (e.g., from the client device) identifying a user interface layer for which display of information related to the user interface layer is not supported at the client device. Notably, the fact that a user interface layer is indicated as not being supported may not necessarily mean that the corresponding user interface layer is incapable of being displayed. Instead, the term "not supported" in this context should be appreciated as conveying that the idea that the corresponding layer is not to be displayed regardless of the capabilities of the device. In some cases, a plurality of user interface layers may be identified as not being supported in a black list. Moreover, in some example embodiments, the user interface layer manager 80 may direct or otherwise be involved in exchanging a black list defining user interface layers for which display of information related to the corresponding user interface layers is not supported at one or both of the server device and the client device and/or exchanging a white list defining user interface layers for which display of information related to the corresponding user interface layers is supported at one or both of the server device and the client device. The user interface layer manager 80 may also be configured to determine a response to a user input provided at the client device based on whether the user input relates to the user interface layer identified by the indication. The response may include reordering a user interface layer hierarchy at the server device based on the indication or re-directing a user input received in connection with a portion of the client device that corresponds to the user interface layer such that the user input is applied to a different layer.

In some embodiments, the user interface layer manager 80 may be configured to receive information indicating that the client device has determined not to display information related to the user interface layer in response to the client device receiving an instruction to emulate the user interface layer. However, in some situations, the user interface layer manager 80 may be configured to receive a black list of one or more user interface layers that are not supported prior to the client device receiving an instruction to emulate the user interface layer. In an example embodiment, the user interface layer manager 80 may also be configured to provide updates to the terminal session including altering instructions regarding user interface layers to be emulated at the client device in response to a change in context of the client device or to provide instructions for the client device to emulate user interface layers of the server device that are not black listed by the client device based on the indication.

Figure 3:
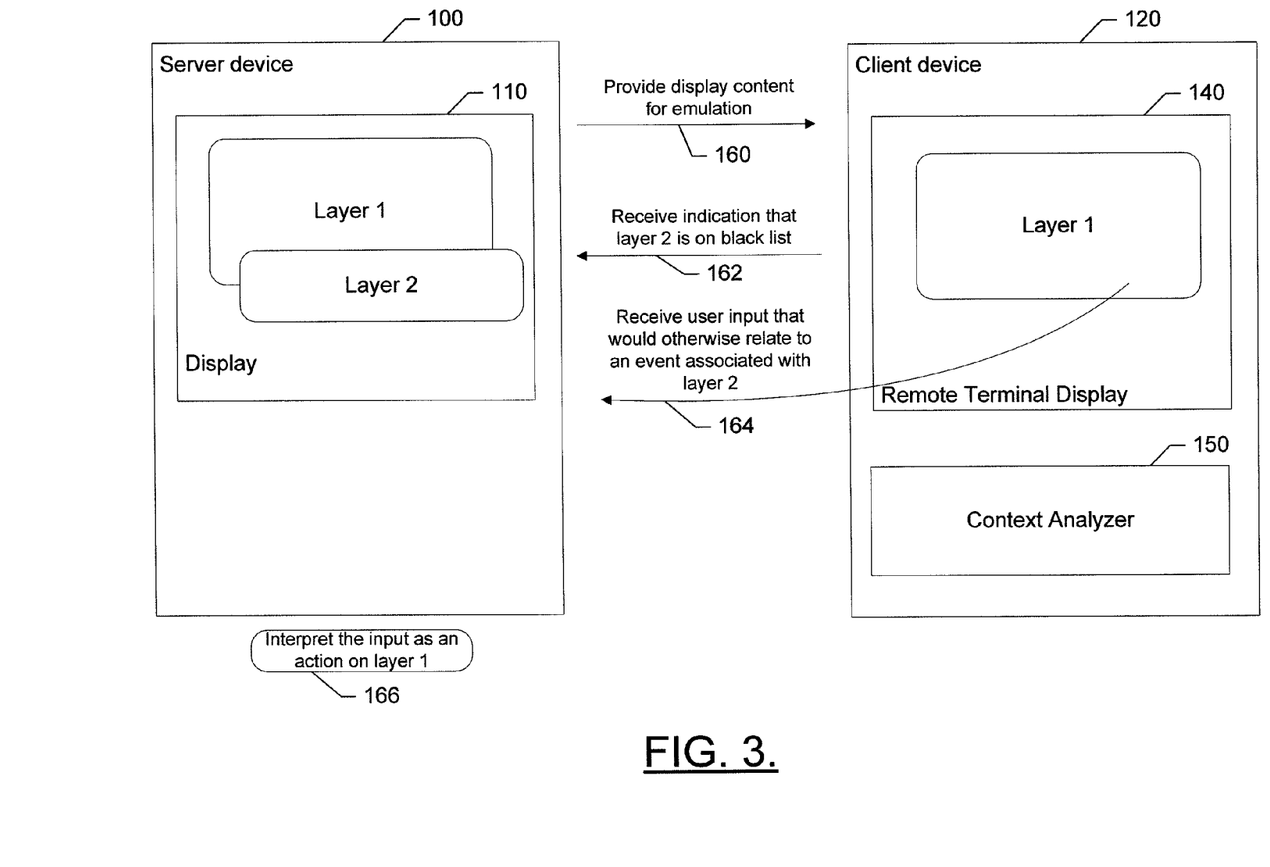
FIG. 3 illustrates a block diagram showing an architecture of two devices cooperating for user interface layer management in accordance with an example embodiment of the present invention.

FIG. 3 illustrates a block diagram of a client device and a server device involved in a terminal session to illustrate an example embodiment. As shown in FIG. 3, a server device 100 may be an example of the mobile terminal 10, which may include a display 110 as a portion of the user interface of the device 100. In some embodiments, the display 110 may be a touch screen display, but a touch screen display is not necessarily used in other embodiments. The client device 120 of this example is a remote environment including a remote terminal display 140. The remote terminal display 140 may be a touch screen display in some cases, but not necessarily all.

As shown in FIG. 3, the server device 100 may be providing a user interface display that includes two layers (e.g., layer 1 and layer 2), each of which may define a user interface layer involving corresponding user interface data to be rendered at the display 110. In this example, it may be assumed that layer 2 is an overlay over the top of layer 1. By way of example, layer 1 may be an interface associated with a media player and layer 2 may be a notification layer indicating receipt of messages (e.g., SMS, email or other messages). The server device 100 may be maintaining a terminal session with the client device 120 to provide instructions to the client device 120 to emulate the rendering provided at the display 110. Responsive to receipt of the instructions, the client device 120 may emulate the display 110 on the remote terminal display 140. However, in some embodiments, the client device 120 (which may have some components similar to those described in connection with the apparatus 50 of FIG. 2) may include certain display or emulation limitations that are either inherent or instantiated in response to the environment or context of the client device. In an example embodiment, the client device 120 (or the server device 100) may include a context analyzer 150 to determine the context or environment of the client device 120. The context analyzer 150 may be any means such as a device or circuitry operating in accordance with software or otherwise embodied in hardware or a combination of hardware and software (e.g., a processor of the client device 120 operating under software control, the processor embodied as an ASIC or FPGA specifically configured to perform the operations described herein, or a combination thereof) thereby configuring the device or circuitry to perform the corresponding functions of the context analyzer 150 as described herein.

The context analyzer 150 may be configured to determine the context environment of a device such as the client device (e.g., the second communication device 20). In some embodiments, the context determination may be generic (e.g., moving or stationary). However, in other embodiments, the context determination may be more specific (e.g., the device being in an automotive context, movement of the device above or below a predetermined speed, the device being in a particular location, etc.). The context analyzer 150 may also be in communication with a movement or other environmental sensor of the second communication device 20 (e.g., a GPS device, cell-tower tracking sensor, or other positioning sensor) in order to receive context information related to location and/or motion (including speed in some cases).

Context information determined by the context analyzer 150 may be determined based on analysis accomplished on the basis of either static or dynamic settings. In this regard, for example, static user settings input by the user may be utilized to determined context information. For example, if the user starts a copying process with regard to frame buffer data, a static user setting may determine by default that the initiation of the copying process confirms an automotive context for the apparatus 50. Dynamic user settings may also be used whereby the user sets a configuration indicating that the user is in a particular context (e.g., via selection from a list of potential contexts or selection of one particular context (e.g., a vehicle context) with which an embodiment is configured to operate). In an example embodiment configured to operate in a vehicle context, if the apparatus 50 is determined to be in the vehicle context, embodiments of the present invention may select content for copying to the client device based on the type of content and based on a rule set governing presentation of content via a vehicle entertainment system. For example, if local rules or regulations provide that a particular portion of the console display of an automobile not be enabled to provide specific user input options or other distracting information to the user above a particular speed, the context information may be indicative of whether the apparatus 50 is in a vehicle context and, in this example, whether the speed is above or below the particular speed. The context information may then be provided to the server device 100 (e.g., to the user interface layer manager 80) for determining whether some portion (or all) of the user interface layers should be blocked from provision to the client device 120. However, in other embodiments, the context information may be used locally at the client device 120 to determine whether to respond to instructions to emulate a certain layer (e.g., layer 1 or layer 2) based on the current context and rules associated with allowable display data for specific contexts. The client device 120 may then inform the server device 100 of any specific layers that the client device 120 cannot support under the circumstances.

In the present example, the server device 100 may instruct the client device 120 to emulate layer 1 and layer 2. The client device 120, based on current context or based on other rules governing rendering options with respect to user interface layers, may determine that layer 2 is not to be rendered and inform the server device 100 via an indication. The server device 100 may then, responsive to the indication that layer 2 is not to be rendered at the remote terminal display 140, modify its hierarchy of layers to recognize layer 2 as being below layer 1. Alternatively, the server device 100 may disable inputs relative to layer 2 by, for example, redirecting such inputs to layer 1. As such, the server device 100 may interpret inputs that would otherwise lead to events associated with layer 2 as being instead applicable to layer 1.

As an alternative to the example above, instead of the client device 120 determining that layer 2 is not to be rendered, the client device 120 may simply provide a black list defining user interface layers that are not to be displayed at the remote terminal display 140 (either at all or under the current circumstances or context). In this example, the server device 100 may be informed via the black list of all layers that are not supported at the client device 120. Accordingly, the server device 100 may not instruct emulation of layer 2 at the client device 120, but may instead modify its hierarchy of layers to recognize layer 2 as being below layer 1 as indicated above, or disable inputs relative to layer 2 by redirecting such inputs to layer 1 as indicated above. As such, the server device 100 may interpret inputs that would otherwise lead to events associated with layer 2 as being instead applicable to layer 1. In other words, for example, if an input is received on the remote terminal display 140 at a location where a black listed user interface layer exists, that input will be disabled (e.g., by the user interface layer manager 80) with respect to the black listed layer. The input may instead be redirected to the next layer that is white listed to which the input may be applicable.

As indicated above, in some cases, black list and/or white list information may be exchanged between the client device 120 and the server device 100. White listing of a user interface layer implies that the corresponding layer is displayable to the user and any user input directed to the corresponding layer is processed. Black listing of a user interface layer implies that the corresponding layer is not displayed to the user and any user input directed to the corresponding layer is not processed with respect to the corresponding layer. The provision of black list and/or white list information from the client device 120 to the server device 100 may occur initially or at any time during a terminal session. Thus, for example, the provision of black list and/or white list information may be provided as an update that may be provided responsive to a change in client device 120 context. The availability of specific user interface layers (e.g., Application Window, Notification Window, Toolbar, Status Bar, and/or the like) may be known before hand and/or provided or updated during the terminal session.

In an example embodiment, the server device 100 may provide display content for emulation to the client device 120 as indicated at operation 160. The client device 120 may have previously indicated that layer 2 is on a black list (or may provide such indication in response to receipt of instructions to emulate) at operation 162. The server device 100 may use the black list information to perform user input adaptation. For example, in response to receipt of a user input that would otherwise relate to an interaction with layer 2 at operation 164, the server device 100 may be configured to interpret the input as an action on layer 1 as indicated at operation 166.

Accordingly, embodiments of the present invention may provide for remote black listing and/or white listing of user interface layers. As such, for example, example embodiments may be enabled to provide user interface layer management so that user interface layers that cannot be or are not desired to be displayed (e.g., at all or in the current context) at a device emulating the display of another may be blocked from display and user inputs may be adapted accordingly.

Figure 4:
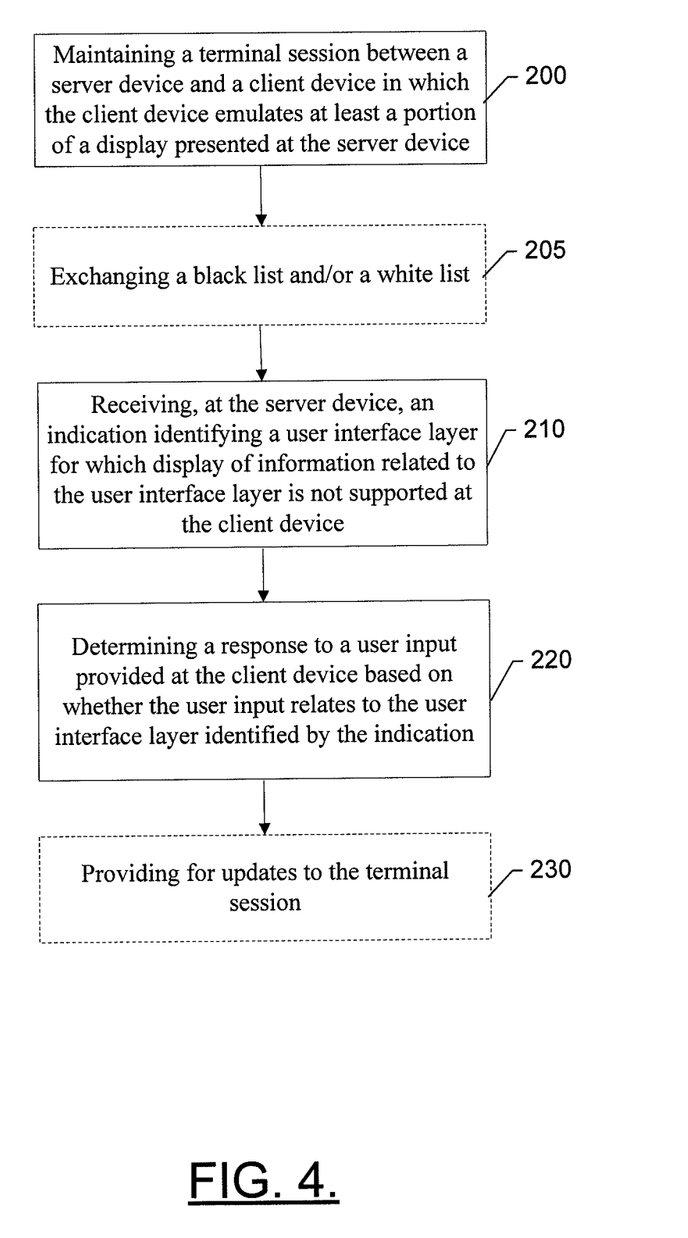
FIG. 4 illustrates a flowchart of a method of providing cooperative user interface layer in accordance with an example embodiment of the present invention.

FIG. 4 is a flowchart of a system, method and program product according to example embodiments of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus implements the functions specified in the flowchart block(s). These computer program instructions may also be stored in a computer-readable memory that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

Accordingly, blocks of the flowchart support combinations of means for performing the specified functions, combinations of operations for performing the specified functions and program instruction means for performing the specified functions. It will also be understood that one or more blocks of the flowchart, and combinations of blocks in the flowcharts, can be implemented by special purpose hardware-based computer systems which perform the specified functions, or combinations of special purpose hardware and computer instructions.

In this regard, one embodiment of a method for providing cooperative user interface layer management, as shown in FIG. 4, includes maintaining a terminal session between a server device and a client device in which the client device emulates at least a portion of a display presented at the server device at operation 200. Maintaining the terminal session may include the monitoring of a communication channel established between the server device and the client device or any other action associated with facilitating continuity of the connection therebetween. In some cases, maintaining the terminal session may include copying frame buffer contents from the server device to the client device. The method may further include receiving, at the server device, an indication identifying a user interface layer for which display of information related to the user interface layer is not supported at the client device at operation 210 and determining (e.g., via the user interface layer manager 80) a response to a user input provided at the client device based on whether the user input relates to the user interface layer identified by the indication at operation 220.

In some embodiments, certain ones of the operations above may be modified or further amplified as described below. Furthermore, in some embodiments, additional optional operations may be included, some examples of which are shown in dashed lines in FIG. 4. Modifications, additions or amplifications to the operations above may be performed in any order and in any combination. In this regard, for example, the method may further include exchanging a black list defining user interface layers for which display of information related to the corresponding user interface layers is not supported at one or both of the server device and the client device and/or exchanging a white list defining user interface layers for which display of information related to the corresponding user interface layers is supported at one or both of the server device and the client device at operation 205. In some embodiments, the method may include providing updates to the terminal session at operation 230. The updates may include altering instructions regarding user interface layers to be emulated at the client device in response to a change in context of the client device and/or providing instructions for the client device to emulate user interface layers of the server device that are not black listed by the client device based on the indication.

In an example embodiment, receiving the indication at operation 210 may include receiving information indicating that the client device has determined not to display information related to the user interface layer in response to the client device receiving an instruction to emulate the user interface layer. In some cases, receiving the indication at operation 210 may also or alternatively include receiving a black list of one or more user interface layers, including the user interface layer, that are not supported prior to the client device receiving an instruction to emulate the user interface layer. In some embodiments, determining the response may include reordering a user interface layer hierarchy at the server device based on the indication. In an example embodiment, determining the response may also or alternatively include re-directing a user input received in connection with a portion of the client device that corresponds to the user interface layer such that the user input is applied to a different layer.

In an example embodiment, an apparatus for performing the method of FIG. 4 above may comprise a processor (e.g., the processor 70) configured to perform some or each of the operations (200-230) described above. The processor may, for example, be configured to perform the operations (200-230) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 200-230 may comprise, for example, the processor 70, the user interface layer manager 80, and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising at least one processor and at least one memory including computer program code, the at least one memory and the computer program code configured to, with the processor, cause the apparatus to at least:
   maintain a terminal session between a server device and a client device in which the client device emulates at least a portion of a display presented at the server device;
   receive, at the server device, an indication identifying a user interface layer for which display of information related to the user interface layer is not supported at the client device by exchanging a black list defining user interface layers for which display of information related to the corresponding user interface layers is not supported at one or both of the server device and the client device or a white list defining user interface layers for which display of information related to the corresponding user interface layers is supported at one or both of the server device and the client device;
   receive an indication of a user input provided at the client device; and
   in an instance in which the server device determines the user input as processed by the server device is associated with the user interface layer, redirect the user input to be applied to a different user interface layer.

2. The apparatus of claim 1, wherein the memory and computer program code are configured to, with the processor, cause the apparatus to receive the indication including receipt of information indicating that the client device has determined not to display information related to the user interface layer in response to the client device receiving an instruction to emulate the user interface layer.

3. The apparatus of claim 1, wherein the memory and computer program code are configured to, with the processor, cause the apparatus to receive the indication including receipt of a black list of one or more user interface layers, including the user interface layer, that are not supported prior to providing an instruction to emulate the user interface layer to the client device.

4. The apparatus of claim 1, wherein the memory and computer program code being configured to, with the processor, cause the apparatus to determine the response includes causing the apparatus to reorder a user interface layer hierarchy at the server device based on the indication.

5. The apparatus of claim 1, wherein the memory and computer program code are configured to, with the processor, cause the apparatus to determine the response includes causing the apparatus to re-direct a user input received in connection with a portion of the client device that corresponds to the user interface layer such that the user input is applied to a different layer.

6. The apparatus of claim 1, wherein the memory and computer program code are configured to, with the processor, cause the apparatus to provide updates to the terminal session including altering instructions regarding user interface layers to be emulated at the client device in response to a change in context of the client device.

7. The apparatus of claim 1, wherein the memory and computer program code are configured to, with the processor, cause the apparatus to provide updates to the terminal session including providing instructions for the client device to emulate user interface layers of the server device that are not black listed by the client device based on the indication.

8. A method comprising:
maintaining a terminal session between a server device and a client device in which the client device emulates at least a portion of a display presented at the server device;
receiving, at the server device, an indication identifying a user interface layer for which display of information related to the user interface layer is not supported at the client device by exchanging a black list defining user interface layers for which display of information related to the corresponding user interface layers is not supported at one or both of the server device and the client device or a white list defining user interface layers for which display of information related to the corresponding user interface layers is supported at one or both of the server device and the client device;
receiving an indication of a user input provided at the client device; and
in an instance in which the server device determines the user input as processed by the server device is associated with the user interface layer, redirecting the user input to be applied to a different user interface layer.

9. The method of claim 8, wherein receiving the indication comprises receiving information indicating that the client device has determined not to display information related to the user interface layer in response to the client device receiving an instruction to emulate the user interface layer.

10. The method of claim 8, wherein receiving the indication comprises receiving a black list of one or more user interface layers, including the user interface layer, that are not supported prior to providing an instruction to emulate the user interface layer to the client device.

11. The method of claim 8, wherein determining the response comprises reordering a user interface layer hierarchy at the server device based on the indication.

12. The method of claim 8, wherein determining the response comprises re-directing a user input received in connection with a portion of the client device that corresponds to the user interface layer such that the user input is applied to a different layer.

13. The method of claim 8, further comprising providing updates to the terminal session including altering instructions regarding user interface layers to be emulated at the client device in response to a change in context of the client device.

14. The method of claim 8, further comprising providing updates to the terminal session including providing instructions for the client device to emulate user interface layers of the server device that are not black listed by the client device based on the indication.

15. A computer program product comprising at least one computer-readable storage medium having computer-executable program code portions stored therein, the computer-executable program code portions comprising program code instructions for:
maintaining a terminal session between a server device and a client device in which the client device emulates at least a portion of a display presented at the server device;
receiving, at the server device, an indication identifying a user interface layer for which display of information related to the user interface layer is not supported at the client device by exchanging a black list defining user interface layers for which display of information related to the corresponding user interface layers is not supported at one or both of the server device and the client device or a white list defining user interface layers for which display of information related to the corresponding user interface layers is supported at one or both of the server device and the client device;
receiving an indication of a user input provided at the client device; and
in an instance in which the server device determines the user input as processed by the server device is associated with the user interface layer, redirecting the user input to be applied to a different user interface layer.

16. The computer program product of claim 15, wherein program code instructions for determining the response include instructions for reordering a user interface layer hierarchy at the server device based on the indication or re-directing a user input received in connection with a portion of the client device that corresponds to the user interface layer such that the user input is applied to a different layer.

17. An apparatus comprising:
means for maintaining a terminal session between a server device and a client device in which the client device emulates at least a portion of a display presented at the server device;
means for receiving, at the server device, an indication identifying a user interface layer for which display of information related to the user interface layer is not supported at the client device by exchanging a black list defining user interface layers for which display of information related to the corresponding user interface layers is not supported at one or both of the server device and the client device or a white list defining user interface layers for which display of information related to the corresponding user interface layers is supported at one or both of the server device and the client device; and
means for receiving an indication of a user input provided at the client device; and in an instance in which the server device determines the user input as processed by the server device is associated with the user interface layer, means for redirecting the user input to be applied to a different user interface layer.

\* \* \* \* \*